(12) United States Patent
Kim et al.

(10) Patent No.: US 9,980,354 B2
(45) Date of Patent: May 22, 2018

(54) LIGHTING SYSTEM AND METHOD FOR REGISTERING LIGHTING DEVICE

(71) Applicant: LG ELECTRONICS INC., Seoul (KR)

(72) Inventors: Duksung Kim, Seoul (KR); Myungbok Yoo, Seoul (KR); Sijeong Ro, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/522,112

(22) PCT Filed: Oct. 5, 2015

(86) PCT No.: PCT/KR2015/010488
§ 371 (c)(1),
(2) Date: Apr. 26, 2017

(87) PCT Pub. No.: WO2016/085110
PCT Pub. Date: Jun. 2, 2016

(65) Prior Publication Data
US 2017/0339770 A1    Nov. 23, 2017

(30) Foreign Application Priority Data
Nov. 28, 2014    (KR) .......................... 10-2014-0168929

(51) Int. Cl.
*H05B 37/02* (2006.01)
*H04L 12/12* (2006.01)

(52) U.S. Cl.
CPC ......... *H05B 37/0272* (2013.01); *H04L 12/12* (2013.01); *H05B 37/0254* (2013.01); *H05B 37/0281* (2013.01)

(58) Field of Classification Search
CPC ............ H05B 33/0854; H05B 33/0872; H05B 37/0218; H05B 37/0227; H05B 37/0272; H05B 37/0281; H05B 37/034
(Continued)

(56) References Cited

U.S. PATENT DOCUMENTS

2010/0209105 A1* 8/2010 Shin ................... H04B 10/1149
398/58
2011/0309769 A1* 12/2011 Kuroki ............... H05B 37/0272
315/294

(Continued)

FOREIGN PATENT DOCUMENTS

JP    2003-348390 A    12/2003
JP    2013-38048 A    2/2013

(Continued)

*Primary Examiner* — Tung X Le
(74) *Attorney, Agent, or Firm* — Birch, Stewart, Kolasch & Birch, LLP

(57) ABSTRACT

Disclosed are a lighting system and a method for registering a lighting device. The embodiments of the present invention comprise: a lighting device which is provided with a short-range communication module and comprises a plurality of light-emitting units; a lighting registration device which is provided with a short-range communication module and an IR communication module and registers the lighting device on the basis of the light-emitting patterns of the light-emitting units; and a lighting switch which is provided with a short-range communication module, binds with the lighting device by receiving, from the lighting registration device, an ID corresponding to the light-emitting patterns of the light-emitting units, and controls the operation of the lighting device. Further, when power is supplied to the lighting device, the lighting registration device recognizes the light-emitting patterns of the light-emitting units and registers the lighting device with an ID corresponding to the recognized light-emitting patterns.

9 Claims, 8 Drawing Sheets

(58) Field of Classification Search
USPC .......................... 315/149, 152, 307, 312, 360
See application file for complete search history.

(56) References Cited

U.S. PATENT DOCUMENTS

| | | | | |
|---|---|---|---|---|
| 2014/0265881 A1* | 9/2014 | Karc | ................... | H05B 37/0272 |
| | | | | 315/158 |
| 2015/0382436 A1* | 12/2015 | Kelly | ..................... | G08C 17/02 |
| | | | | 315/131 |
| 2016/0057836 A1* | 2/2016 | Aykroyd | ............ | H05B 37/0272 |
| | | | | 307/31 |

FOREIGN PATENT DOCUMENTS

| KR | 10-2013-0003870 A | 1/2013 |
|---|---|---|
| KR | 10-2013-0091116 A | 8/2013 |
| KR | 10-2004-0039911 A | 4/2014 |
| KR | 10-2014-0039911 A | 4/2014 |
| KR | 10-2014-0088665 A | 7/2014 |
| KR | 10-2014-0124924 A | 10/2014 |

\* cited by examiner

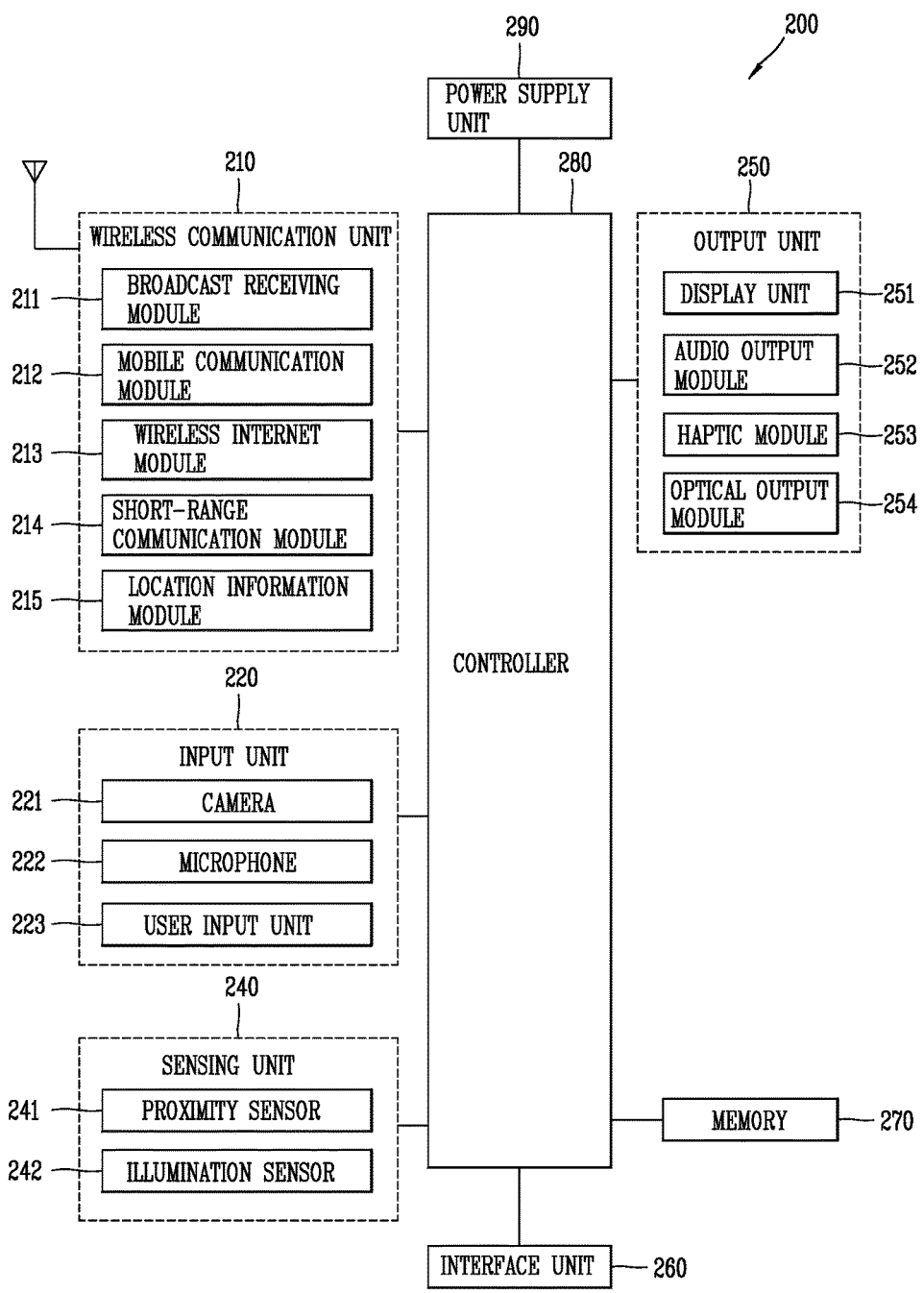

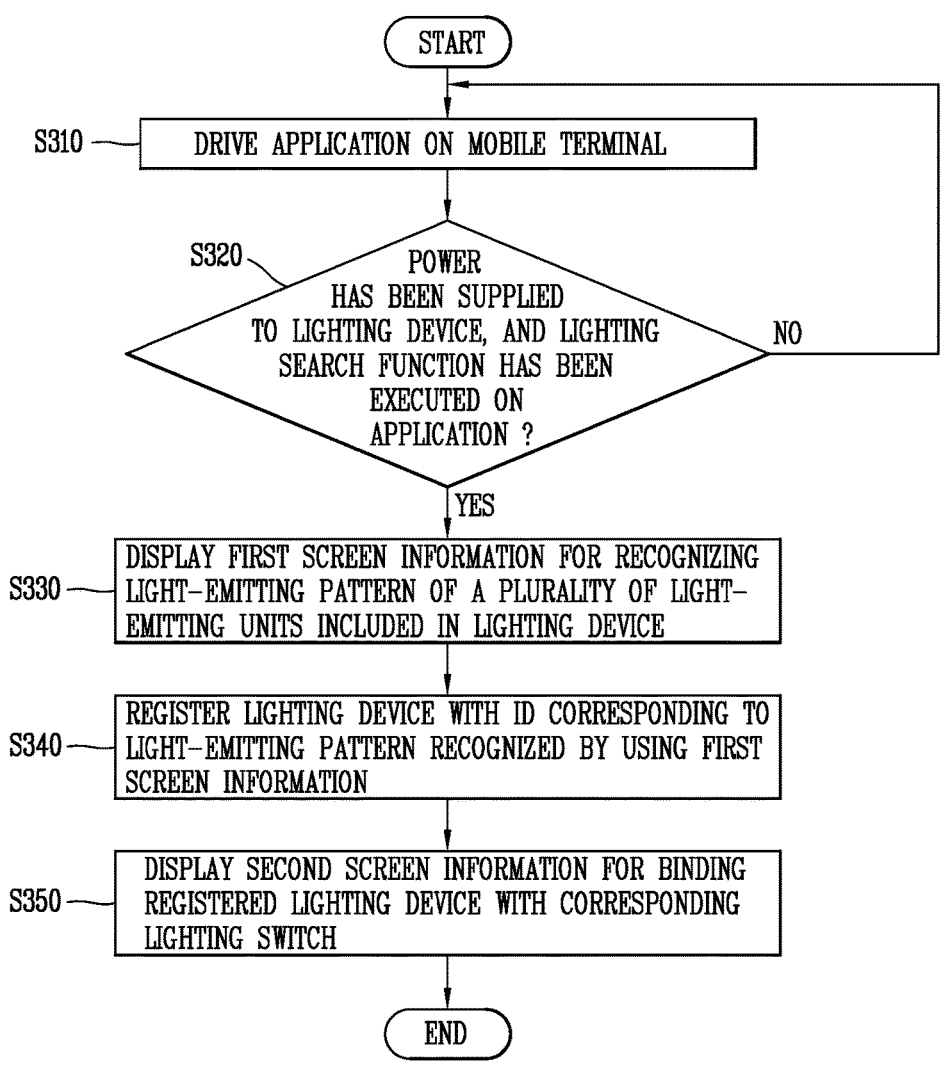

LIGHTING SYSTEM AND METHOD FOR REGISTERING LIGHTING DEVICE

CROSS REFERENCE TO RELATED APPLICATIONS

This application is the National Phase of PCT International Application No. PCT/KR2015/010488, filed on Oct. 5, 2015, which claims priority under 35 U.S.C. 119(a) to Patent Application No. 10-2014-0168929, filed in Republic of Korea on Nov. 28, 2014, all of which are hereby expressly incorporated by reference into the present application.

TECHNICAL FIELD

The present invention relates to a lighting system and a method for registering a lighting device, and more particularly, to a lighting system capable of registering a lighting device using a mobile terminal, and a method for registering a lighting device.

BACKGROUND ART

The conventional lighting system has used a light source such as an incandescent lamp, a discharge lamp and a fluorescent lamp, and has been mainly used for home, scenery, industry, etc. Among such light sources, a resistance type light source such as an incandescent lamp has low efficiency and a low heat emission characteristic. The discharge lamp has a problem of high price and high voltage, and the fluorescent lamp has an environmental problem due to usage of mercury.

Due to such reasons, in a lighting industry field, research is ongoing to develop a light source for a lighting device, a light-emitting method, a driving method, etc. despite a long history.

With respect to a light source of a lighting system, a light emitting diode (LED), which has advantages in efficiency, various colors, the degree of freedom for design, etc., is being spotlighted. The LED is a semiconductor device which emits light when a voltage is applied thereto in a forward direction, and has a long lifespan, a low power consumption, and electrical, optical and physical characteristics suitable for massive production. Due to such characteristics, the conventional light sources are rapidly replaced by the LED.

However, in case of installing or replacing a large number of lighting devices at a tall construction such as a building, or at small and medium constructions, it is difficult to recognize each lighting device in registering the installed or replaced lighting device. Further, it is difficult to control the lighting device to be registered with a unique address according to an intention of a manager, etc.

DISCLOSURE OF THE INVENTION

Therefore, an object of the present invention is to provide a lighting system capable of conveniently registering a lighting device with a unique ID by using a flickering characteristic of the lighting device, and a method for registering a lighting device.

Another object of the present invention is to provide a lighting system capable of easily connecting a registered lighting device with a switch/sensor, and a method for registering a lighting device.

Another object of the present invention is to provide a lighting system capable of simply initializing a pre-registered lighting device by using an application, and a method for registering a lighting device.

To achieve these and other advantages and in accordance with the purpose of the present invention, as embodied and broadly described herein, there is provided a lighting system, comprising: a lighting device having a short-range communication module, and including a plurality of light-emitting units; a lighting registration device provided with a short-range communication module and an IR communication module, and configured to register the lighting device based on a light-emitting pattern of the light-emitting units; and a lighting switch provided with a short-range communication module, which binds with the lighting device by receiving an ID corresponding to the light-emitting pattern of the light-emitting units, from the device for registering a light-emitting device, and configured to control an operation of the lighting device, wherein when a power is supplied to the lighting device, the lighting registration device recognizes a light-emitting pattern of the light-emitting units, and registers the corresponding lighting device with an ID corresponding to the recognized light-emitting pattern.

In an embodiment, the light-emitting pattern means a change pattern of at least one of a color of the light-emitting units, dimming, the number of times of light emission, a duration time of light emission and a combination thereof.

In an embodiment, the lighting registration device is a mobile terminal having a touch screen, and if an input region for inputting the light-emitting pattern is displayed on the touch screen, the mobile terminal recognizes the light-emitting pattern based on a touch input applied to the input region.

In an embodiment, the lighting registration device is provided with one or more cameras, and if a power is supplied to the lighting device, the lighting registration device senses a light-emitting pattern of the light-emitting units by driving the camera.

In an embodiment, if there are a plurality of lighting devices to be registered, the lighting registration device displays thumbnail images corresponding to the plurality of lighting devices to be registered, on a touch screen, and controls lighting devices corresponding to selected thumbnail images among the displayed thumbnail images to be registered simultaneously.

In an embodiment, if the lighting device is registered, the lighting registration device receives position information of the corresponding lighting device, and displays, on a touch screen, screen information for binding the corresponding lighting device with a corresponding lighting switch.

In an embodiment, the lighting registration device displays, on the screen information, first images indicating registered lighting switches, and second images indicating registered lighting devices corresponding to the lighting switches, based on the received position information. And if a drag input starting from one of the first and second images to another is applied, the lighting registration device binds a lighting switch corresponding to the first image with a lighting device corresponding to the second image.

In an embodiment, the lighting system further comprises a gateway configured to perform ZigBee communication among the lighting device, the lighting switch and the device for registering a light-emitting device. And the lighting registration device provides an ID of a registered lighting device to the gateway.

In an embodiment, if the bound lighting switch is turned on, the lighting registration device displays, on a touch screen, an icon for deleting a registered state of a lighting device corresponding to the switch. And the lighting registration device initializes the registered lighting device based on a touch input applied to the icon.

To achieve these and other advantages and in accordance with the purpose of the present invention, as embodied and broadly described herein, there is also provided a method for registering a lighting device of an application which is driven on a mobile terminal, the method comprising: driving the application on the mobile terminal; if a power is supplied to the lighting device and a lighting search function is executed on the application, displaying first screen information for recognizing a light-emitting pattern of a plurality of light-emitting units included in the lighting device; and registering the lighting device with an ID corresponding to the light-emitting pattern recognized by using the first screen information, and displaying second screen information for binding the registered lighting device with a corresponding lighting switch.

EFFECTS OF THE PRESENT INVENTION

In the lighting system and the method for registering a lighting device according to an embodiment of the present invention, a light-emitting pattern of a lighting device installed at a building, etc. is recognized by a camera, etc. provided at a mobile terminal. As a result, the installed lighting device can be easily recognized, and the lighting device can be registered with its unique ID according to an intention of a manager, etc.

Further, in the lighting system and the method for registering a lighting device according to an embodiment of the present invention, a binding operation between the lighting device and the switch/sensor, for integrally controlling the lighting device in an environmental manner, may be performed easily and conveniently.

Further, in the lighting system and the method for registering a lighting device according to an embodiment of the present invention, a registered state of a lighting device may be released by using an application, or a lighting device registered to an undesired gateway may be initialized more easily without passing through the gateway.

BRIEF DESCRIPTION OF THE DRAWINGS

FIG. 2 is a is a block diagram showing a configuration of a mobile terminal in more detail, as an example of a lighting registration device according to the present invention;

FIG. 3 is a flowchart showing an example of a lighting device registering method of an application driven on a mobile terminal according to the present invention;

MODES FOR CARRYING OUT THE PREFERRED EMBODIMENTS

Figure 1A:
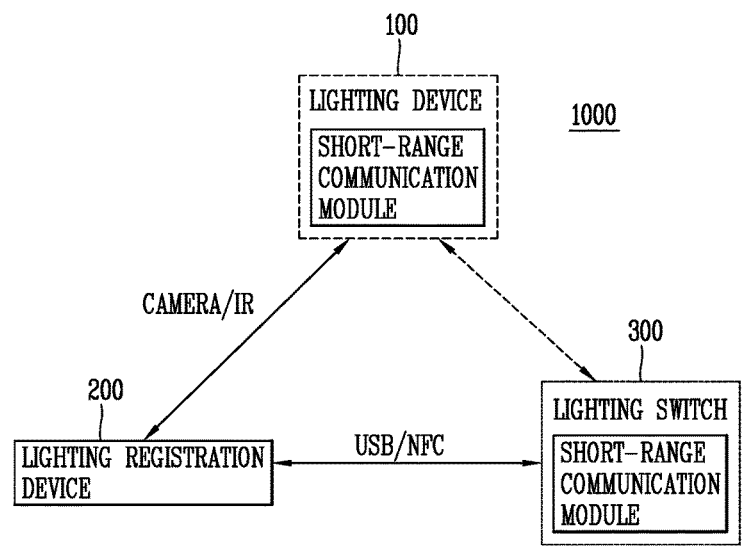
FIGS. 1A and 1B are block diagrams showing different examples of a lighting system according to the present invention.

Description will now be given in detail according to exemplary embodiments disclosed herein, with reference to the accompanying drawings, such that those skilled in the art may easily perform the technical gist of the present invention. The present invention may be implemented in many different forms, and is not limited to embodiments explained in this description. In the present disclosure, a part which is unrelated to descriptions has been omitted, and similar components are provided with similar reference numbers.

A lighting registration device ("A device for registering a light-emitting device") disclosed in this specification hereinafter is used to register one or more lighting devices (or light-emitting portions). The lighting registration device may include all types of means implemented to control a lighting system (or one or more lighting devices) through a wired/wireless network, in a case where one or more lighting devices are registered by the lighting registration device.

The lighting registration device may include a standing terminal such as a digital TV and a personal computer (PC), and a mobile terminal such as a smart phone, a tablet PC, a notebook, an ultrabook, a wearable device (e.g., a smart watch, a smart glass or a head mounted display (HMD)). One device may indirectly serve to register and control a lighting device through another device. Hereinbelow, the lighting registration device was implemented as a mobile terminal, for convenience.

A mobile terminal used as the lighting registration device may use a firmware or an application for controlling a lighting device. For this, the firmware or the application may be pre-stored in a mobile terminal, or may be downloaded from an external server. The lighting registration device may include a software configuration and a hardware configuration in an integrated or separated manner, and may be used to control a lighting device.

A lighting device (A light-emitting device) to be described hereinafter may mean a lighting system in some cases, or a lighting device, i.e., a light emitting unit (light emitting device: LED).

A wire/wireless (communication) network to be described hereinafter includes all network means required for all devices for a lighting system to transceive data therebetween using various communication standards. Such network means may include communication standards for wired connection such as USB (Universal Serial Bus), CVBS (Composite Video Banking Sync), component, S-video (analogue), DVI (Digital Visual Interface), HDMI (High Definition Multimedia Interface), RGB, and D-SUB, and may include communication means or communication standards for wireless connection such as Bluetooth, RFID (Radio Frequency Identification), IrDA (infrared Data Association), UWB (Ultra Wideband), ZigBee, DLNA (Digital Living Network Alliance), WLAN (Wireless LAN) (Wi-Fi), Wibro (Wireless broadband), Wimax (World Interoperability for Microwave Access), HSDPA (High Speed Downlink Packet Access), LTE (Long Term Evolution), BLE (Bluetooth Low Energy), and Wi-Fi Direct. Accordingly, even without additional explanations in this specification, each component of a lighting system includes an integrated/separate means or module for processing data or signals related to a corresponding communication standard in relation to a lighting control, due to its characteristic.

Figure 1B:
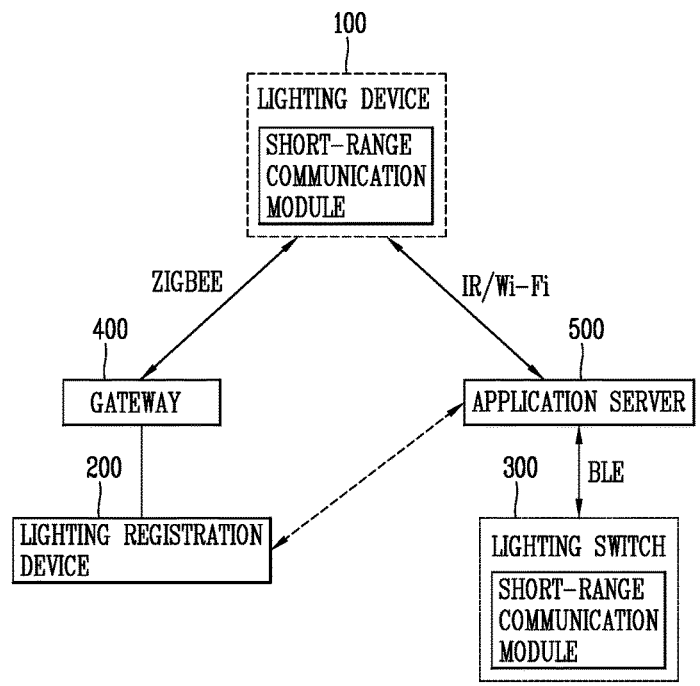

FIGS. 1A and 1B are block diagrams showing different examples of a lighting system according to the present invention.

For instance, a lighting system 1000 according to the present invention may include one or more lighting devices 100, a lighting registration device 200, and a lighting switch 300, as shown in FIG. 1A.

The lighting device 100 may be provided at a tall construction such as a building, or at small and medium constructions such as home. The lighting device 100 is provided with a short-range communication module for communication with other devices, and includes a plurality of light emitting devices. Each of the light emitting devices (LEDs) may represent a color and dimming by receiving a power from a light emitting portion, a means to connect/disconnect each of the light emitting devices. The light emitting portion which supplies a power to the light emitting devices may be referred to as lighting equipment or an LED device.

The lighting device 100 may be further provided with an IR sensor and/or camera for communication with the lighting registration device 200 which will be explained later. In this case, the lighting device 100 may transmit and receive data to and from the lighting registration device 200, through the IR sensor and/or camera.

The lighting registration device 200 may include all means to recognize a light-emitting pattern of light-emitting units included in the lighting device 100, and to register the lighting device with a unique ID. For this, the lighting registration device 200 may be provided with a short-range communication module and an IR communication module, thereby performing wireless communication with the installed lighting device 100. And the lighting registration device 200 may check a position of the installed lighting device 100 based on a beacon signal received from the installed lighting device 100.

More specifically, if a power is supplied to the installed lighting device, the lighting registration device 200 may recognize a light-emitting pattern of the light-emitting units by driving a corresponding application. Here, the light-emitting pattern means a change pattern of at least one of a color of the lighting device 100, dimmingin, the number of times of light emission, a duration time of light emission and a combination thereof. For instance, as a power is supplied after the lighting device is installed, the lighting device is turned on in order of red, yellow, yellow, blue and green, at predetermined time intervals (e.g., 2 seconds). In this case, such a color change is the light-emitting pattern. Here, a manager, etc. may set a specific color (e.g., blue) as a registration starting time. In this case, blue and green lights are the light-emitting pattern. Once the light-emitting pattern of the light-emitting units included in the lighting device is recognized, the lighting registration device 200 may register a corresponding lighting device by providing a unique ID.

The lighting switch 300 may be paired with the lighting registration device 200, through a wired communication module such as a USB, or through a short-range wireless communication module such as an NFC. In this case, the lighting switch 300 may receive, from the lighting registration device 200, a light-emitting pattern of the installed lighting device or a unique ID of the registered lighting device. The lighting switch 300 may bind with the registered lighting device based on the received light-emitting pattern or the unique ID. The lighting switch 300 which has bound with the registered lighting device may be separated from the lighting registration device 200, thereby controlling an on/off operation, a color, dimming, a motion, etc. of the lighting device 100, in the form of a standalone configuration.

As another example, as shown in FIG. 1B, in the lighting system 1000 according to the present invention, one or more lighting devices 100 may be connected to the lighting registration device 200 through a gateway 400, and the lighting device 100 may bind with the lighting switch 300 through an application server 500.

The gateway 400 performs ZigBee communication among the lighting device 100, the lighting switch 300, and the lighting registration device 200. The gateway 400 may perform by receiving a control command with respect to a control of a lighting group or individual units, from a controller which controls an entire operation of the lighting device. And the gateway 400 may provide a result of the performance to the controller. Once a power is supplied to the lighting device 100, the gateway 400 recognizes it and provides received beacon information to the lighting registration device 200, in the form of a list, etc.

The application server 500 may include a cloud server or a lighting server which is interworked with the lighting device 100 directly or through the lighting registration device 200. If the application server 500 is interworked with one or more lighting devices 100 through the lighting registration device 200, it is connected to the lighting registration device 200 as an application driven on the lighting registration device 200 is executed. In this case, the lighting registration device 200 plays a role of a relay between the lighting device 100 and the application server 500 in the lighting system 1000.

As aforementioned, the lighting registration device 200 can be implemented as a mobile terminal.

FIG. 2 is a is a block diagram showing a configuration of the mobile terminal 200 in more detail, as an example of the lighting registration device according to the present invention.

The mobile terminal 200 is shown having components such as a wireless communication unit 210, an input unit 220, a sensing unit 240, an output unit 250, an interface unit 260, a memory 270, a controller 280, and a power supply unit 290. It is understood that implementing all of the illustrated components shown in FIG. 2 is not a requirement, and that greater or fewer components may alternatively be implemented.

More specifically, the wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks.

To facilitate such communications, the wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, voice or images) is obtained by the input unit 220 and may be processed according to a user command.

The sensing unit 240 is typically implemented using one or more sensors configured to sense internal information of the mobile terminal, the surrounding environment of the mobile terminal, user information, and the like. For example, the sensing unit 240 is shown having a proximity sensor 241 and an illumination sensor 242. If desired, the sensing unit 240 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and combinations thereof.

The output unit 250 is typically configured to output various types of information, such as audio, video, tactile output, and the like. The output unit 250 is shown having a display unit 251, an audio output module 252, a haptic module 253, and an optical output module 254.

The display unit 251 may have an inter-layered structure or an integrated structure with a touch sensor in order to facilitate a touch screen. The touch screen may provide an output interface between the mobile terminal 200 and a user, as well as function as the user input unit 223 which provides an input interface between the mobile terminal 200 and the user.

The interface unit 260 serves as an interface with various types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 may provide or process information or functions appropriate for a user by processing signals, data, information and the like, which are input or output by the aforementioned various components, or activating application programs stored in the memory 270. As one example, the controller 280 controls some or all of the components according to the execution of an application program that have been stored in the memory 270.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body.

At least some of the above components may operate in a cooperating manner, so as to implement an operation or a control method of the image information projection device 200 according to various embodiments to be explained later. The operation or the control method of the image information projection device 200 may be implemented on the image information projection device by driving at least one application program stored in the memory 270.

Hereinafter, the above components will be explained in more detail with reference to FIG. 2, before explaining various embodiments implemented by the aforementioned mobile terminal 200.

Regarding the wireless communication unit 210, the broadcast receiving module 211 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 211 may be utilized to facilitate simultaneously receiving of two or more broadcast channels, or to support switching among broadcast channels.

The mobile communication module 212 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 212 include audio call signals, video (telephony) call signals, or various formats of data to support communication of text and multimedia messages.

The wireless Internet module 213 is configured to facilitate wireless Internet access. This module may be internally or externally coupled to the mobile terminal 200. The wireless Internet module 213 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 213 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 213 performs such wireless Internet access. As such, the Internet module 213 may cooperate with, or function as, the mobile communication module 212.

The short-range communication module 214 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 214 in general supports wireless communications between the mobile terminal 200 and a wireless communication system, communications between the mobile terminal 200 and another mobile terminal 200, or communications between the mobile terminal and a network where another mobile terminal 200 (or an external server) is located, via wireless area networks. One example of the wireless area networks is a wireless personal area networks.

In some embodiments, another mobile terminal (which may be configured similarly to mobile terminal 200) may be a wearable device, for example, a smart watch, a smart glass or a head mounted display (HMD), which is able to exchange data with the mobile terminal 200 (or otherwise cooperate with the mobile terminal 200). The short-range communication module 214 may sense or recognize the wearable device, and permit communication between the wearable device and the mobile terminal 200. In addition, when the sensed wearable device is a device which is authenticated to communicate with the mobile terminal 200, the controller 280, for example, may cause transmission of data processed in the mobile terminal 200 to the wearable device via the short-range communication module 214. Hence, a user of the wearable device may use the data processed in the mobile terminal 200 on the wearable device. For example, when a call is received in the mobile terminal 200, the user may answer the call using the wearable device. Also, when a message is received in the mobile terminal 200, the user can check the received message using the wearable device.

The location information module 215 is generally configured to detect, calculate, derive or otherwise identify a position of the mobile terminal. As an example, the location information module 215 includes a Global Position System (GPS) module, a Wi-Fi module, or both. If desired, the location information module 215 may alternatively or additionally function with any of the other modules of the wireless communication unit 210 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 220 may be configured to permit various types of input to the mobile terminal 220. Examples of such input include audio, image, video, data, and user input. Image and video input is often obtained using one or more cameras 221. Such cameras 221 may process image frames of still pictures or video obtained by image sensors in a video or image capture mode. The processed image frames can be displayed on the display unit 251 or stored in memory 270. In some cases, the cameras 221 may be arranged in a matrix configuration to permit a plurality of images having various angles or focal points to be input to the mobile terminal 200. As another example, the cameras 221 may be located in a stereoscopic arrangement to acquire left and right images for implementing a stereoscopic image.

The microphone 222 is generally implemented to permit audio input to the mobile terminal 200. The audio input can be processed in various manners according to a function being executed in the mobile terminal 200. If desired, the microphone 222 may include assorted noise removing algorithms to remove unwanted noise generated in the course of receiving the external audio.

The user input unit 223 is a component that permits input by a user. Such user input may enable the controller 280 to control operation of the mobile terminal 200. The user input unit 223 may include one or more of a mechanical input element (for example, a key, a button located on a front and/or rear surface or a side surface of the mobile terminal 200, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 240 is generally configured to sense one or more of internal information of the mobile terminal, surrounding environment information of the mobile terminal, user information, or the like. The controller 280 generally cooperates with the sending unit 240 to control operation of the mobile terminal 200 or execute data processing, a function or an operation associated with an application program installed in the mobile terminal based on the sensing provided by the sensing unit 240. The sensing unit 240 may be implemented using any of a variety of sensors, some of which will now be described in more detail.

The proximity sensor 241 may include a sensor to sense presence or absence of an object approaching a surface, or an object located near a surface, by using an electromagnetic field, infrared rays, or the like without a mechanical contact. The proximity sensor 241 may be arranged at an inner region of the mobile terminal covered by the touch screen, or near the touch screen.

The proximity sensor 241, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 241 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 241 may sense proximity touch, and proximity touch patterns (for example, distance, direction, speed, time, position, moving status, and the like).

In general, controller 280 processes data corresponding to proximity touches and proximity touch patterns sensed by the proximity sensor 241, and cause output of visual information on the touch screen. In addition, the controller 280 can control the mobile terminal 200 to execute different operations or process different data according to whether a touch with respect to a point on the touch screen is either a proximity touch or a contact touch.

A touch sensor can sense a touch applied to the touch screen, such as display unit 251, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 251, or convert capacitance occurring at a specific part of the display unit 251, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 280. Accordingly, the controller 280 may sense which region of the display unit 251 has been touched. Here, the touch controller may be a component separate from the controller 280, the controller 280, and combinations thereof.

In some embodiments, the controller 280 may execute the same or different controls according to a type of touch object that touches the touch screen or a touch key provided in addition to the touch screen. Whether to execute the same or different control according to the object which provides a touch input may be decided based on a current operating state of the mobile terminal 200 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 280, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 221 typically includes at least one a camera sensor (CCD, CMOS etc.), a photo sensor (or image sensors), and a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 251 is generally configured to output information processed in the mobile terminal 200. For example, the display unit 251 may display execution screen information of an application program executing at the mobile terminal 200 or user interface (UI) and graphic user interface (GUI) information in response to the execution screen information.

In some embodiments, the display unit 251 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 252 is generally configured to output audio data. Such audio data may be obtained from any of a number of different sources, such that the audio data may be received from the wireless communication unit 210 or may have been stored in the memory 270. The audio data may be output during modes such as a signal reception mode, a call mode, a record mode, a voice recognition mode, a broadcast reception mode, and the like. The audio output module 252 can provide audible output related to a particular function (e.g., a call signal reception sound, a message reception sound, etc.) performed by the mobile terminal 200. The audio output module 252 may also be implemented as a receiver, a speaker, a buzzer, or the like.

A haptic module 253 can be configured to generate various tactile effects that a user feels, perceive, or otherwise experience. A typical example of a tactile effect generated by the haptic module 253 is vibration. The strength, pattern and the like of the vibration generated by the haptic module 253 can be controlled by user selection or setting by the controller. For example, the haptic module 253 may output different vibrations in a combining manner or a sequential manner.

Besides vibration, the haptic module 253 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 253 can also be implemented to allow the user to feel a tactile effect through a muscle sensation such as the user's fingers or arm, as well as transferring the tactile effect through direct contact. Two or more haptic modules 253 may be provided according to the particular configuration of the mobile terminal 200.

An optical output module 254 can output a signal for indicating an event generation using light of a light source. Examples of events generated in the mobile terminal 200 may include message reception, call signal reception, a missed call, an alarm, a schedule notice, an email reception, information reception through an application, and the like.

A signal output by the optical output module 254 may be implemented in such a manner that the mobile terminal emits monochromatic light or light with a plurality of colors. The signal output may be terminated as the mobile terminal senses that a user has checked the generated event, for example.

The interface unit 260 serves as an interface for external devices to be connected with the mobile terminal 200. For example, the interface unit 260 can receive data transmitted from an external device, receive power to transfer to elements and components within the mobile terminal 200, or transmit internal data of the mobile terminal 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 200 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 200 via the interface unit 260.

When the mobile terminal 200 is connected with an external cradle, the interface unit 260 can serve as a passage to allow power from the cradle to be supplied to the mobile terminal 200 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 270 can store programs to support operations of the controller 280 and store input/output data (for example, phonebook, messages, still images, videos, etc.). The memory 270 may store data related to various patterns of vibrations and audio which are output in response to touch inputs on the touch screen.

The memory 270 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 200 may also be operated in relation to a network storage device that performs the storage function of the memory 270 over a network, such as the Internet.

The controller 280 may typically control the general operations of the mobile terminal 200. For example, the controller 280 may set or release a lock state for restricting a user from inputting a control command with respect to applications when a status of the mobile terminal meets a preset condition.

The controller 280 can also perform the controlling and processing associated with voice calls, data communications, video calls, and the like, or perform pattern recognition processing to recognize a handwriting input or a picture drawing input performed on the touch screen as characters or images, respectively. In addition, the controller 280 can control one or a combination of those components in order to implement various exemplary embodiments disclosed herein.

The power supply unit 290 receives external power or provides internal power and supply the appropriate power required for operating respective elements and components included in the mobile terminal 200. The power supply unit 290 may include a battery, which is typically rechargeable or be detachably coupled to the terminal body for charging.

The power supply unit 290 may include a connection port. The connection port may be configured as one example of the interface unit 260 to which an external charger for supplying power to recharge the battery is electrically connected.

As another example, the power supply unit 290 may be configured to recharge the battery in a wireless manner without use of the connection port. In this example, the power supply unit 290 can receive power, transferred from an external wireless power transmitter, using at least one of an inductive coupling method which is based on magnetic induction or a magnetic resonance coupling method which is based on electromagnetic resonance.

FIG. 3 is a flowchart showing an example of a lighting device registering method of an application driven on the mobile terminal 200 according to the present invention.

Referring to FIG. 3, an application to register one or more lighting devices is driven on the mobile terminal 200 (S310). The application may be pre-installed on the mobile terminal 200, or may be downloaded from a predetermined server.

Then, once a power is supplied to at least one lighting device, a lighting search function is executed from the application (S320). For instance, the lighting search function may be executed as a lighting search menu displayed on a touch screen of the mobile terminal is selected as the application is executed. Once the lighting search function is executed, the mobile terminal may communicate with the at least one lighting device through an IR signal, or may communicate with the mobile terminal via IR/Wi-Fi wireless communication, by using the aforementioned gateway for relay. As a result, beacon information on a lighting device to be registered is displayed on the touch screen of the mobile terminal, in the form of a list.

Then, first screen information for recognizing a light-emitting pattern of a plurality of light-emitting units included in the at least one lighting device is displayed on the touch screen 251 of the mobile terminal 200 (S330). Here, the light-emitting pattern mean a change pattern of at least one of a color of the lighting device 100, dimming, the number of times of light emission, a duration time of light emission and a combination thereof, as aforementioned. For instance, as a power is supplied to an installed lighting device, the lighting device may be turned on at predetermined time intervals (e.g., 2 seconds), in order of red, yellow, yellow, blue and green. In this case, such a color change is the light-emitting pattern. Here, a manager, etc. may set a specific color (e.g., blue) as a registration starting time point. For instance, if a control command for executing a lighting search function is input (e.g., a lighting search menu is selected) when the lighting device is turned on in the blue color in the above example, a registrable time is differently set even if a lighting search function is executed nearby. This may allow a lighting to be registered with a unique ID.

There may be largely two types of methods of recognizing a light-emitting pattern of a plurality of light-emitting units. One is a method of recognizing a light-emitting pattern through a manual input, which is a method of displaying, on first screen information, an input region to directly input a change of a color pattern by a user, etc. Another is a method of automatically recognizing a light-emitting pattern, which is a method of automatically sensing a color change by displaying a preview screen of a lighting device to be registered, on first screen information. The method of recognizing a light-emitting pattern will be explained in more detail with reference to FIGS. 4A to 4C.

Then, the at least one lighting device is registered with an ID corresponding to the recognized light-emitting pattern, by using the displayed first screen information (S340). The ID corresponding to the recognized light-emitting pattern is generated as a unique ID such as a MAC address, by combining a change pattern of a plurality of colors with a registration time of the lighting device. Such registration information may be transmitted to a cloud server which controls at least one lighting device, and position information on the registered lighting device may be provided to a mobile terminal and a cloud server.

Then, on the touch screen 251, displayed is second screen information for binding the registered lighting device with a corresponding lighting switch (S350). Here, the lighting switch may be one pre-registered at the mobile terminal 200. For this, the lighting switch may be connected to an application for registering a lighting device driven on the mobile terminal, via short-range wireless communication, e.g., low power wireless communication (BLE communication). More specifically, the mobile terminal 200 may recognize and register one or more lighting switches via BLE communication, and may transmit beacon information related to the lighting device to the registered lighting switch. For instance, the mobile terminal 200 senses a nearby lighting switch, and performs a connection with the lighting switch. As a result, an authentication procedure with respect to the lighting switch, etc. may be automatically performed, and a pairing between the mobile terminal 200 and the lighting switch 300 may be performed. Once the pairing is performed, a light-emitting pattern for recognizing a lighting device, a unique ID (UUID) corresponding to a light-emitting pattern, BD address information, a MAC address, a manager application URL address, etc. are transmitted to the lighting switch, through the mobile terminal 200. Once the mobile terminal 200 and the lighting switch 300 perform BLE communication, wireless communication may be performed with a low power (e.g., power corresponding to about 1~5% of a Bluetooth communication standard) while stability and security, advantages of Bluetooth, are maintained. The aforementioned process of pairing between the lighting switch and the mobile terminal may be also applied to a lighting sensor for sensing dimming, a color, a color temperature, etc. of a lighting device.

The second screen information may include an input region for binding a registered lighting device and a registered lighting switch with each other, and guide information thereof. Once the binding is performed, even if communication between the lighting switch and the mobile terminal is released, a lighting device may be independently controlled to be turned on/off by the lighting switch.

In the aforementioned embodiment, a lighting device to be registered may be provided with a unique ID based on a light-emitting pattern of the lighting device, and a binding operation between the lighting device and the lighting switch may be easily performed by the mobile terminal. This may enhance a user's convenience.

The lighting system disclosed in the present specification may be largely divided into a management part, a control part, and a device part.

The management part may further include a monitoring module and a web server. The monitoring module may be a management software, or a hardware operated by the management software. And the web server may be connected to a user's PC through Internet, and may receive a control input with respect to the lighting device and transmit the control input. The management part may be connected to a controller inside the control part to be explained later in a manner of Transfer Control Protocol/Internet Protocol (TCP/IP) or Simple Object Access Protocol/Extensible Markup Language (SOAP/XML), and may perform a setting, a control and a monitoring of a lighting device, and may perform information exchange.

The control part may further include a controller and the aforementioned gateway and interface unit. The controller may be connected to the interface unit and the gateway in a manner of TCP/IP, and may control the device part through the gateway. And the interface unit may provide a control touch panel.

The device part mainly includes a device implemented in the form of a hybrid solution, but may include a device implemented in the form of a legacy solution.

The hybrid solution means a solution to constitute a single set by combining devices of various purposes. For instance, a set may be configured as bridge devices connected to the gateway, a plurality of light-emitting portions connected to the bridge devices, a program switch and one or more sensors are combined with each other. The hybrid solution may include a plurality of gateways, or may include a single gateway to which a plurality of bridge devices are connected.

Although not shown, the legacy solution, connected to the controller in a manner of a 3rd-party protocol, may be configured as a Network Control Unit (NCU), a Lighting Interface Unit (LIU), a Central Processing Unit (CPU), a Transmission Unit (TU), a relay, a program switch, etc. are combined with each other.

The above configuration may be applied when the lighting system of the present invention is implemented at a small building such as home, and when the lighting system is implemented at a large building such as a building or a factory. In the case where the lighting system is implemented at a large building such as a building or a factory, may be required one or more bridge devices, and a plurality of light-emitting portions connected to the bridge devices and capable of performing communication. The bridge devices may be configured to perform communication with each other, by being further connected to a lighting switch for controlling on/off, a dimming degree, etc. of the plurality of light-emitting portions, a sensor for sensing an illumination of an illumination space, etc.

The lighting device of the lighting system is operated under an assumption that it is registered with a unique identifier.

Figure 4A:
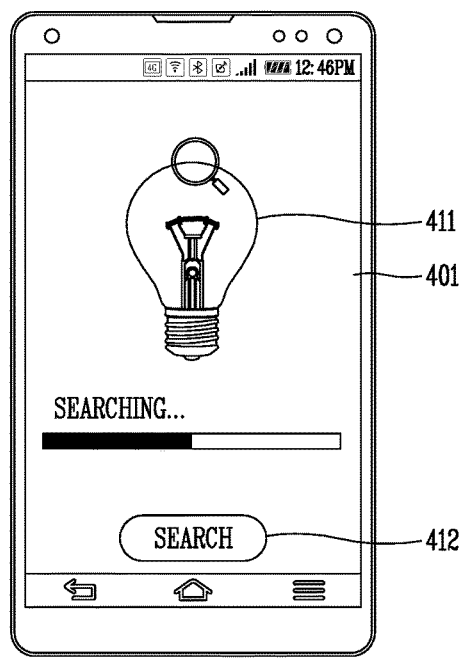
FIGS. 4A-4C are exemplary views showing a method of recognizing a light-emitting pattern of a lighting device according to an embodiment of the present invention.
Figure 4B:
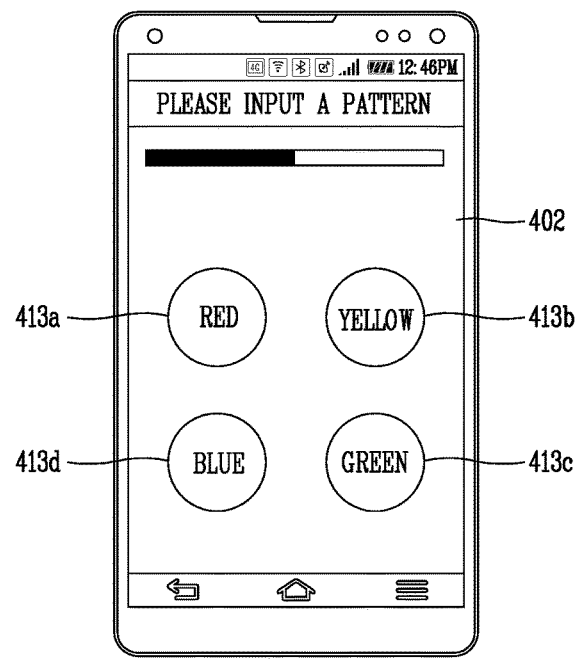
Figure 4C:
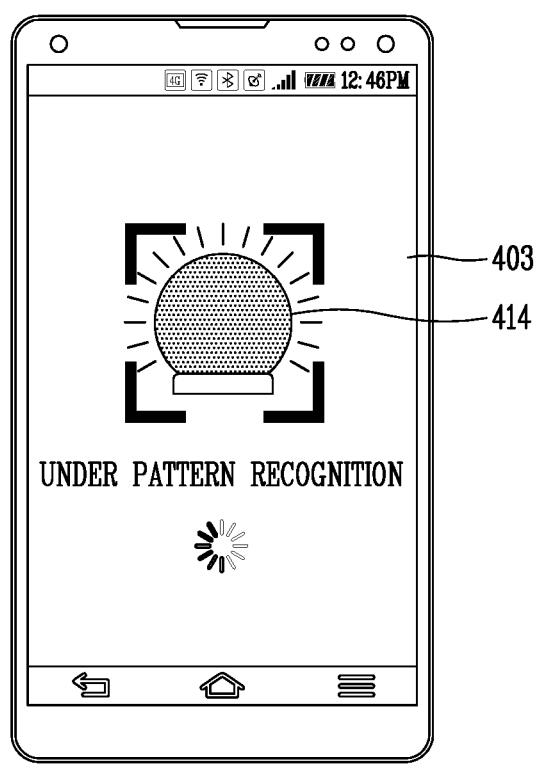

FIGS. 4A to 4C are exemplary views showing a method of recognizing a light-emitting pattern of a lighting device in order to register one or more lighting devices, according to an embodiment of the present invention.

In the conventional art, when a lighting device is installed, a bulb manufacturing company has attached a QR code or a barcode to the lighting device for sale in order to register the lighting device with a unique identifier, and has registered the lighting device in a reading manner through a mobile terminal, etc. In this case, if a label attached to the lighting device is damaged, it is difficult to register the lighting device. Further, in case of a large building where a plurality of lighting devices are installed, management costs may be increased as the lighting devices are replaced, etc.

Accordingly, in the present invention, a lighting device is registered as its unique ID is generated based on a light-emitting pattern using a characteristic of an LED lighting device. The light-emitting pattern means a change pattern of at least one of a color of a plurality of light-emitting units, dimmingin, the number of times of light emission, a duration time of light emission and a combination thereof. For instance, in case of a color LED lighting device, a plurality of color lights may be emitted in a predetermined order to form a preset pattern (e.g., yellow-red-red-blue-green lights are emitted at intervals of 2 seconds). On the other hand, if a case of a colorless LED lighting device, a preset pattern may be formed through a combination of the number of times of light emission by light-emitting units, a light emission interval, etc. (e.g., 1-second 'on'/2-second 'off'/three-second 'on'/1-second 'off'). Hereinafter, a color LED lighting device is explained as an example.

If a power is supplied to a lighting device to be registered, as shown in FIG. 4A, screen information 401 for searching a nearby registrable lighting device is displayed on the touch screen 251 of the mobile terminal 200. The screen information 401 may display a thumbnail image 411 indicating a lighting device to be registered. If a user applies a touch input to a 'search' icon 412, a function to search for a nearby registrable lighting device is executed.

In an embodiment, a pattern of a color change may be recognized based on a user's input. For this, the lighting registration device 200 may be the mobile terminal having the touch screen 251. In this case, if an input region to input a light-emitting pattern of the lighting device 100 to be registered is displayed on the touch screen 251, the mobile terminal 200 may recognize a light-emitting pattern of the lighting device 100, based on a touch input applied to the displayed input region.

For instance, as shown in FIG. 4B, if a power is supplied to an installed lighting device and the lighting registration device 200 performs a lighting search function, the lighting device emits light in various colors, in order preset when it is manufactured. For instance, in a case where yellow, blue, red and blue lights are emitted at intervals of 2 seconds, a user, etc. may recognize a light-emitting pattern of the lighting device by applying a plurality of touch inputs to a plurality of touch regions 413a, 413b, 413c, 414d on screen information 402 for inputting a light-emitting pattern, in order of color change. The user, etc. may input a light-emitting pattern by sequentially touching the 'yellow' region 413b, the 'blue' region 413d, the 'red' region 413a, and the 'blue' region 413d on the displayed screen information 402. In this case, time information on a time when the user has registered the lighting device by inputting the light-emitting pattern is recorded together. Then, the lighting registration device 200 may generate a unique ID of the lighting device by combining the light-emitting pattern of the lighting device to be registered with the registration time of the lighting device.

However, such a method is a little inconvenient in that a user should memorize and directly input a light-emitting pattern of a lighting device to be registered.

In another embodiment, a pattern of a color change may be automatically recognized by using a camera, etc. For this, the lighting registration device 200 may be provided with a camera 221 or a camera 221 and an IR sensor. And the lighting registration device 200 may automatically sense a light-emitting pattern of the light-emitting units, by driving the camera provided thereat when a power is supplied to a lighting device to be registered.

For instance, as shown in FIG. 4C, as the camera 221 provided at the mobile terminal 200 is driven, a preview screen 403 of a lighting device to be registered is displayed on the touch screen 251. If a focusing image 414 with respect to a nearby registrable lighting device is formed on the preview screen 403, sensing a light-emitting pattern is started. Then, the mobile terminal 200 may extract information on a changing color from the preview screen 403. Then, the mobile terminal 200 may recognize a light-emitting pattern of the lighting device, by connecting the extracted color information to each other in time order. Although not shown, the camera may be provided at a lighting device. In this case, the lighting registration device may recognize a light-emitting pattern by receiving a plurality of images from the lighting device to be registered.

A user, etc. may select a time point to recognize a light-emitting pattern of a plurality of light-emitting units. More specifically, if a lighting device to be registered is searched and the lighting device starts to emit light as shown in FIG. 4A, a different pattern may be recognized according to a time point when a touch input is applied to a pattern recognition icon (not shown) displayed on the touch screen 251. As aforementioned above, if a lighting device to be registered emits light in order of yellow, blue, red and blue at intervals of 2 seconds, different patterns may be recognized in a case where a user touches a pattern recognition icon before yellow light is emitted, and in a case where a user touches the pattern recognition icon before red light is emitted. The lighting registration device 200 may generate a unique ID of a lighting device by combining a recognized light-emitting pattern with a recognition time of the light-emitting pattern.

A user, etc. may select a time point to register a light-emitting pattern of light emitting units. That is, as a registration timing synch is applied to a light-emitting pattern of a lighting, a lighting device is registered only to a desired gateway with enhanced accuracy. For instance, as aforementioned above, if a lighting device to be registered emits light in order of yellow, blue, red and blue at intervals of 2 seconds, the same light-emitting pattern may be recognized in a case where a user starts a registration in a yellow light, and in a case where a user starts a registration in a blue light. However, in this case, since a registration starting time of the lighting device is changed, a possibility to register the lighting device to be registered to another nearby gateway is minimized or becomes zero. The lighting registration device 200 may generate a unique ID of a lighting device by combining a recognized light-emitting pattern with a registration time of the lighting device.

Once a lighting device is registered with its unique ID, the lighting registration device 200 provides information on the registered lighting device, to a corresponding gateway or a pre-selected gateway. Further, the lighting registration device 200 may manage and control the registered lighting device via IR wireless communication, without passing through a gateway.

In any case of the aforementioned cases, when a lighting device is registered by the lighting registration device, the lighting device may be registered according to a user's intention, and unique identification information may be generated by connecting a light-emitting pattern of the lighting device to be registered with a registration starting time, without a unique label of the lighting device.

Figure 5A:
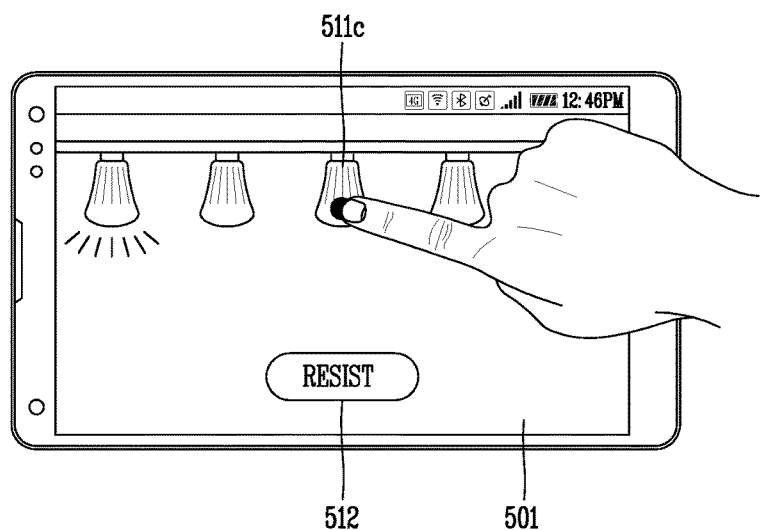
FIGS. 5A and 5B are exemplary views showing a method of registering a plurality of lighting devices according to an embodiment of the present invention.
Figure 5B:
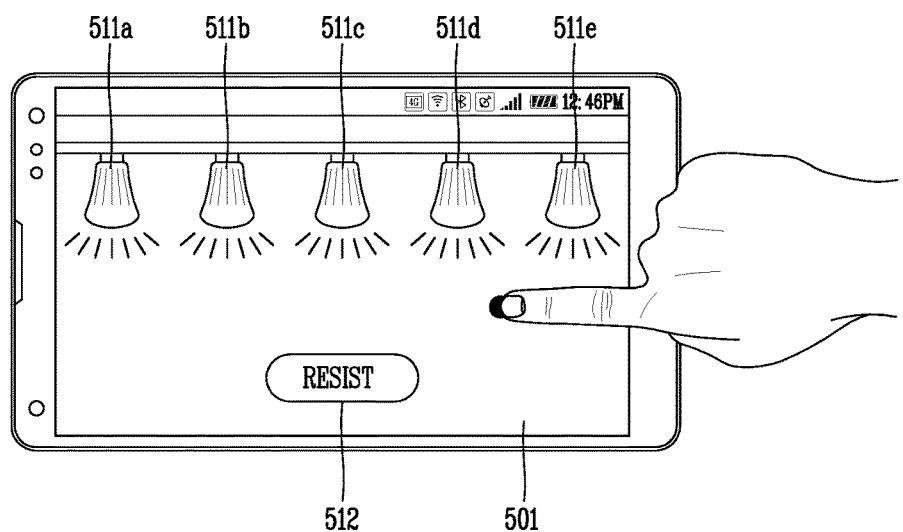

FIGS. 5A and 5B are exemplary views showing a method of registering a plurality of lighting devices according to an embodiment of the present invention.

If a plurality of lighting devices to be registered are searched as a lighting search function is executed, the lighting registration device may register one of the searched plurality of lighting devices, or may register the searched plurality of lighting devices at one time. For instance, as shown in FIG. 5A, as a lighting search function is executed, thumbnail images corresponding to a plurality of registrable lighting devices are displayed on the touch screen 251 of the lighting registration device 200. In this case, if a user selects a specific lighting device image 511c to be registered and then applies a touch input to a 'resist' icon 512, registration procedures with respect to only a lighting device corresponding to the selected specific lighting device image 511c are started.

In a displayed state of thumbnail images 511a, 511b, 511c, 511d, 511e corresponding to a plurality of registrable lighting devices, if a long touch input is applied to a background image as shown in FIG. 5B, all the lighting devices corresponding to the displayed thumbnail images 511a, 511b, 511c, 511d, 511e are selected. Then, if a touch input is applied to the 'resist' icon 512, registration procedures with respect to all of the selected lighting devices are simultaneously started. In this case, the simultaneously-registered lighting devices may be registered with a single ID, and are managed and controlled as a single group in this case. Although not shown, a method of simultaneously selecting a plurality of registrable lighting devices is not limited to this. For instance, a touch input may be applied only to desired thumbnail images to be registered, among the displayed thumbnail images 511a, 511b, 511c, 511d, 511e, for selection. And a touch input may be re-applied to a selected thumbnail image, for cancel of the selection. Alternatively, a selected thumbnail image may be provided with a mark corresponding to the selection, and information on a lighting device corresponding to the selected thumbnail image (e.g., position information, installation position) may be popped-up for a predetermined time.

Figure 6A:
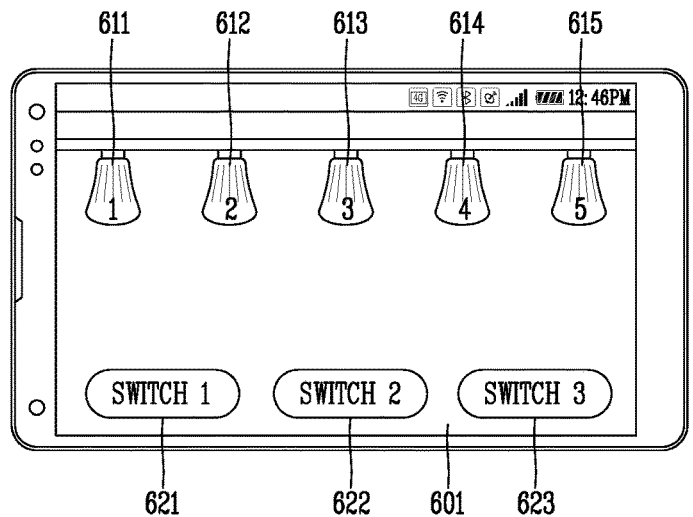
FIGS. 6A and 6B are exemplary views showing a method of binding lighting devices and lighting switches with each other according to an embodiment of the present invention.
Figure 6B:
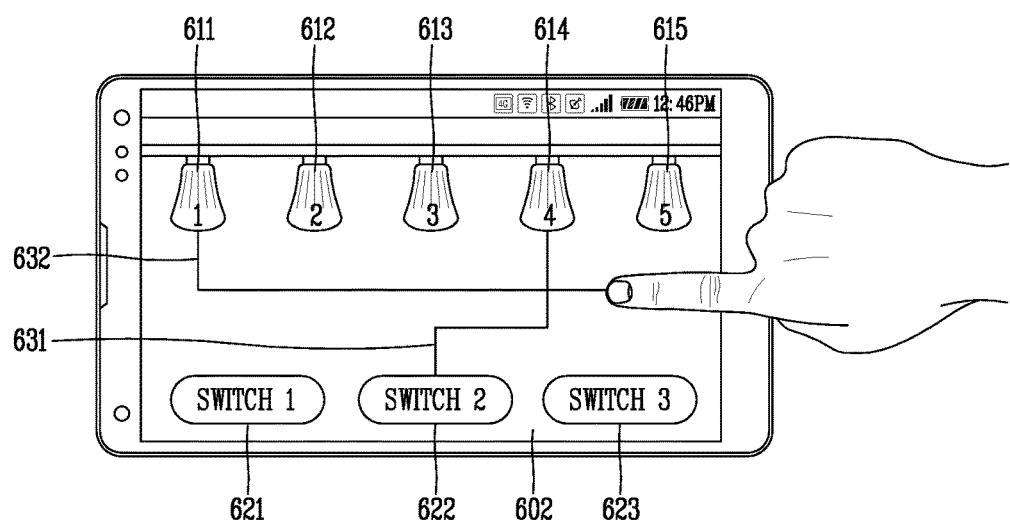

FIGS. 6A and 6B are exemplary views showing a method of binding lighting devices and lighting switches with each other according to an embodiment of the present invention.

The lighting registration device 200 and a lighting switch 300/sensor may communicate with each other through wired communication using a USB, etc., or through short-range wireless communication using an NFC module, etc. For this, the lighting switch 300/sensor may be pre-registered to the lighting registration device 200. In this case, once one or more lighting devices are registered, the lighting registration device 200 transmits registration information of the lighting device, e.g., a unique ID, to the registered lighting switch.

Once one or more lighting devices are registered, the lighting registration device 200 may communicate with the lighting device 100 to receive position information from the corresponding lighting device, and may receive state information of the corresponding lighting device through a gateway. In this case, if the lighting registration device 200 is within a short distance from the registered lighting device, the lighting registration device 200 may directly manage and control the registered lighting device without a gateway through IR communication. Further, the lighting registration device 200 may check a lighting device to be replaced due to a breakdown among registered lighting devices, through a gateway, before replacement is performed.

Further, the lighting registration device 200 performs a relay for binding one or more registered lighting devices with the lighting switch/sensor. For this, the lighting registration device 200 may display, on the touch screen 251, screen information for binding the corresponding lighting device with a corresponding lighting switch, based on position information received from the registered lighting device 100.

More specifically, as shown in FIG. 6A, the lighting registration device 200 displays, on the touch screen 251, screen information 601 including first images 621, 622, 623 indicating registered lighting switches, and second images 611, 612, 613, 614, 615 indicating registered lighting devices corresponding to the lighting switches, based on position information received from the lighting device 100. Here, the first images may be images or icons indicating a lighting switch/sensor installed nearby (or which has not bound) on the basis of a position of a registered lighting device. And the second images may be thumbnail images indicating registered lighting devices on the basis of a specific position.

If a drag input starting from one of the first and second images to another is applied, the lighting registration device 200 may bind a lighting switch corresponding to the first image with a lighting device corresponding to the second image. For instance, as shown in FIG. 6B, if a drag input is applied to connect the displayed lighting device '4' (614) with the switch '2' (622), the lighting device '4' and the switch '2' bind with each other. And if a drag input is applied to connect the lighting device '1' (611) with the switch '3' (623), the lighting device '1' and the switch '3' bind with each other. As a result, a user, etc. may control an on/off operation, dimming, feeling of color, etc. of the lighting device '4' through the switch '2', and may control an on/off operation, dimming, feeling of color, etc. of the lighting device '1' through the switch '3'. Although not shown, if a long touch input is applied to connection lines 631, 632 which connect the lighting devices with the switches, the binding may be cancelled or changed.

The lighting registration device 200 may register a lighting device and a lighting switch/sensor, and may periodically or non-periodically broadcast registration information and binding information of the lighting device and the lighting switch/sensor after the lighting device and the lighting switch/sensor bind with each other, thereby checking a device from which an error has occurred, a device to be replaced, a device which has been replaced/added, etc. for update. And the lighting registration device 200 may store previous registration information or binding information for a predetermined time after a device is replaced, thereby easily re-allocating an ID or performing a binding operation.

A registered lighting device and a registered lighting switch/sensor need to be initialized in some cases. For instance, when a specific lighting device is not used any longer, or when a lighting device is registered to another building or an undesired gateway, a registration needs to be initialized. In the conventional art, if a bound lighting switch is consecutively turned on/off a predetermined number of times, a lighting device is initialized through a gateway. In this case, if a plurality of lighting devices are registered to one lighting switch, other undesired lighting devices may be initialized. Further, in case of initializing a plurality of lighting devices at one time, a user had a difficulty in repeatedly turning on/off each lighting switch.

Figure 7A:
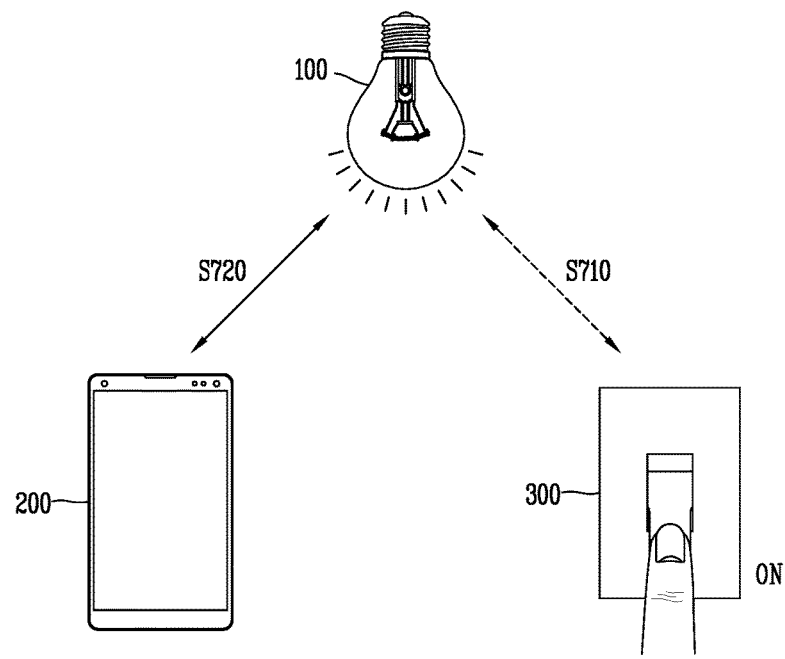
FIGS. 7A and 7B are exemplary views showing a method of initializing a registered lighting device according to an embodiment of the present invention.
Figure 7B:
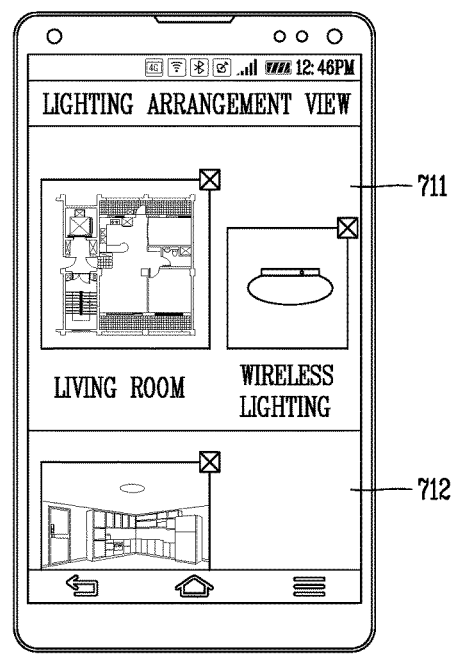

In the present invention, a registered lighting device may be initialized easily and simply by using the lighting registration device 200. FIGS. 7A and 7B show a method of initializing a registered lighting device according to an embodiment of the present invention.

As shown in FIG. 7A, if a lighting device to be initialized and a switch which has bound are converted into an 'on' state or an 'off' state, an 'on/off' operation of the bound lighting device is performed (S710), and such state information is transmitted to the lighting registration device 200 (S720). Here, it is assumed that an application related to a registration method of a lighting device is executed on the lighting registration device 200. And the lighting registration device 200 displays, on the touch screen 251, a position of the lighting device of which state conversion information has been received, as the application is executed.

For instance, if one of lighting devices which are positioned in a 'living room' is converted into an 'on' state as shown in FIG. 7A, a lighting arrangement view 711 including a 'living room' at a central region is displayed on the touch screen 251 of the lighting registration device 200 as shown in FIG. 7B. More specifically, a lighting arrangement view 711 including a 'living room' at a central region may be displayed on a first region of the touch screen 251, and another lighting arrangement view 712 with respect to a nearby region may be partially displayed on a second region.

In this case, each of images included in the lighting arrangement views 711, 712 is provided with an icon for deletion ('x'-included box image) at a right upper end. The lighting registration device 200 initializes a pre-registered lighting device based on a touch input or a click applied to the icon. And the lighting registration device 200 may provide information on a lighting device to be initialized, i.e., initialization information of a lighting device, to a corresponding gateway. Then, the gateway may check a stored unique ID of the lighting device (e.g., an MAC address) for deletion.

Although not shown, in order to initialize a lighting device without through the lighting registration device 200, a bound lighting switch which is in an 'on' state is converted into an 'off' state within a reference time (e.g., 2 seconds) in a conventional manner. Here, such an operation is repeated a predetermined number of times. If a plurality of lighting devices bind with one lighting device, the plurality of lighting devices are simultaneously initialized. If a lighting search function of the lighting registration device 200 is executed, the initialized lighting device may be rapidly registered again based on the existing registration information stored in a gateway.

As aforementioned, in the lighting system and the method for registering a lighting device according to an embodiment of the present invention, a light-emitting pattern of a lighting device installed at a building, etc. is recognized by using a camera, etc. provided at a mobile terminal. As a result, the installed lighting device can be easily recognized, and the lighting device can be registered with its unique ID according to an intention of a manager, etc. Further, a binding operation between the lighting device and the switch/sensor, for integrally controlling the lighting device in an environmental manner, may be performed easily and conveniently. Further, a registered state of a lighting device may be released by using an application, or a lighting device registered to an undesired gateway may be initialized more easily without passing through the gateway.

It is understood by those skilled in the art that the present features can be embodied in several forms without departing from the characteristics thereof. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A lighting system, comprising:
   a lighting device having a short-range communication module, and including a plurality of light-emitting units;
   a lighting registration device provided with a short-range communication module and an IR communication module, and configured to register the lighting device based on a light-emitting pattern of the light-emitting units; and
   a lighting switch provided with a short-range communication module, which binds with the lighting device by receiving a unique ID corresponding to the light-emitting pattern of the light-emitting units, from the lighting registration device, if the lighting device is registered, and configured to control an operation of the registered lighting device,
   wherein if a power is supplied to the lighting device to be registered, the lighting registration device senses a light emission of the light-emitting units of the lighting device to be registered, by driving a camera provided thereat, and
   wherein if a registration starting request with respect to the lighting device is received, the lighting registration device recognizes a light-emitting pattern of the light-emitting units of the lighting device to be registered, generates a unique ID of the lighting device to be registered by combining the recognized light-emitting pattern with a time point when the registration starting request has been received, and registers the corresponding lighting device with the generated unique ID.

2. The lighting system of claim 1, wherein the light-emitting pattern means a change pattern of at least one of a color of the light-emitting units, dimming, the number of times of light emission, a duration time of light emission and a combination thereof.

3. The lighting system of claim 1, wherein the lighting registration device is a mobile terminal having a touch screen, and
   wherein if an input region for inputting the light-emitting pattern is displayed on the touch screen, the mobile terminal recognizes the light-emitting pattern based on a touch input applied to the input region.

4. The lighting system of claim 1, wherein if there are a plurality of lighting devices to be registered, the lighting registration device displays thumbnail images corresponding to the plurality of lighting devices to be registered, on a touch screen, and controls lighting devices corresponding to selected thumbnail images among the displayed thumbnail images to be registered simultaneously.

5. The lighting system of claim 1, wherein if the lighting device is registered, the lighting registration device receives position information of the corresponding lighting device, and displays, on a touch screen, screen information for binding the corresponding lighting device with a corresponding lighting switch.

6. The lighting system of claim 5, wherein the lighting registration device displays, on the screen information, first images indicating registered lighting switches, and second images indicating registered lighting devices corresponding to the lighting switches, based on the received position information, and wherein if a drag input starting from one of the first and second images to another is applied, the lighting registration device binds a lighting switch corresponding to the first image with a lighting device corresponding to the second image.

7. The lighting system of claim 1, further comprising a gateway configured to perform zigbee communication among the lighting device, the lighting switch and the device for registering a light-emitting device, wherein the lighting registration device provides an ID of a registered lighting device to the gateway.

8. The lighting system of claim 1, wherein if the bound lighting switch is turned on, the lighting registration device displays, on a touch screen, an icon for deleting a registered state of a lighting device corresponding to the switch, and wherein the lighting registration device initializes the registered lighting device based on a touch input applied to the icon.

9. A method for registering a lighting device of an application which is driven on a mobile terminal, the method comprising:

driving the application on the mobile terminal;

if a power is supplied to a lighting device to be registered and a lighting search function is executed on the application, displaying first screen information for recognizing a light-emitting pattern of a plurality of light-emitting units included in the lighting device to be registered;

if a registration starting request with respect to the lighting device is input by using the first screen information, recognizing a light-emitting pattern of the light-emitting units of the lighting device to be registered;

generating a unique ID of the lighting device to be registered by combining the recognized light-emitting pattern with a time point when the registration starting request has been input; and registering the corresponding lighting device with the generated unique ID, and displaying second screen information for binding the registered lighting device with a corresponding lighting switch.

* * * * *